United States Patent Office.

EDMOND Q. HENDERSON, OF CHARLOTTE, NORTH CAROLINA, ASSIGNOR TO JOHN C. BURROUGHS AND RICHARD A. SPRINGS, OF SAME PLACE.

Letters Patent No. 112,453, dated March 7, 1871.

IMPROVEMENT IN COMPOSITIONS FOR LUBRICATING MACHINERY.

The Schedule referred to in these Letters Patent and making part of the same.

I, EDMOND Q. HENDERSON, of the city of Charlotte, county of Mecklenburg and State of North Carolina, have invented a certain compound "Anti-friction Lubricating-Paste and Oil," to be used for the purpose of lubricating car-axles and machinery generally.

The nature of this invention consists in mixing resin, flowers of sulphur, crude antimony, oil of rosemary, lamp-black, water, and carburet of iron with a solution of oil and sheep-tallow.

To prepare the anti-friction lubricating-paste, take a quantity of oil, say neats-foot, about ten gallons; add ten pounds of sheep's-tallow; heat the same to a boiling point, and add three pounds of resin; when this is dissolved add two pounds of the flowers of sulphur, one pound of crude antimony, also one-half pound of oil of rosemary; mix with this twenty-five pounds of lamp-black, and to all this add water and carburet of iron at pleasure, which, when cool, will be of the consistency of paste, and ready for use upon machinery.

In very cold climates castor-oil must be used instead of the neats-foot oil.

In order to manufacture the anti-friction lubricating-oil, mix and dissolve five pounds of the anti-friction lubricating-paste in one gallon of pure oil. It will then be ready for use on such machinery as the paste cannot be applied to.

The anti-friction lubricating-paste and the oil are resistants of heat, and when applied to the journals, car-axles, &c., of machinery or engines liable to heat by the great number of revolutions and friction, it will have the effect of cooling the heated journals or axles and keeping the same cool. It will be a superior lubricator, and will prevent gumming. It is economical, and has durability.

I claim—

The manufacture or preparation of a compound denominated anti-friction lubricating-paste and oil, of the ingredients, in the proportions, and for the purposes set forth above.

EDM. Q. HENDERSON.

Witnesses:
ROBT. G. TREZEVANT,
S. B. ALEXANDER.